United States Patent
Kuroki

(10) Patent No.: US 11,956,556 B2
(45) Date of Patent: Apr. 9, 2024

(54) IMAGING APPARATUS

(71) Applicant: Panasonic Intellectual Property Management Co., Ltd., Osaka (JP)

(72) Inventor: Hiroyuki Kuroki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/994,056

(22) Filed: Nov. 25, 2022

(65) Prior Publication Data
US 2023/0199334 A1 Jun. 22, 2023

(30) Foreign Application Priority Data
Dec. 16, 2021 (JP) ................. 2021-204525

(51) Int. Cl.
*H04N 23/957* (2023.01)
*H04N 25/76* (2023.01)
*H04N 25/77* (2023.01)

(52) U.S. Cl.
CPC .......... *H04N 23/957* (2023.01); *H04N 25/76* (2023.01); *H04N 25/77* (2023.01)

(58) Field of Classification Search
CPC ...... H04N 23/957; H04N 25/76; H04N 25/77; H04N 23/51; H04N 23/54
See application file for complete search history.

(56) References Cited

U.S. PATENT DOCUMENTS

| | | | |
|---|---|---|---|
| 2003/0214588 A1 | 11/2003 | Takizawa et al. | |
| 2007/0297780 A1* | 12/2007 | Enomoto | G03B 5/02 348/E5.025 |
| 2009/0002852 A1* | 1/2009 | Wang | G02B 7/025 359/819 |
| 2011/0036982 A1* | 2/2011 | Chiang | H04N 1/482 250/226 |
| 2012/0300320 A1* | 11/2012 | Matsuda | G02B 3/0006 359/811 |
| 2015/0350500 A1* | 12/2015 | Gutierrez | H04N 23/54 348/374 |
| 2016/0269643 A1* | 9/2016 | Numako | H04N 23/667 |

(Continued)

FOREIGN PATENT DOCUMENTS

| | | |
|---|---|---|
| JP | 2004-064555 A | 2/2004 |
| JP | 2008-187439 A | 8/2008 |

(Continued)

*Primary Examiner* — Hung H Lam
(74) *Attorney, Agent, or Firm* — Renner, Otto, Boisselle & Sklar, LLP

(57) ABSTRACT

An imaging apparatus includes: an imaging element including an imaging surface on which light from a subject is incident; an imaging unit that supports the imaging element in a state where the imaging surface faces forward; a casing including a through hole in a front surface and accommodating the imaging unit in a state where a front side portion of the imaging unit passes through the through hole so as to protrude from the front surface; and an actuator that is provided in the casing and displaces the imaging unit in a direction intersecting a normal direction of the imaging surface. The imaging unit includes a flange portion extending outward from the front side portion of the imaging unit so as to cover at lease part pf a gap between the through hole of the casing and the imaging unit.

9 Claims, 7 Drawing Sheets

(56) References Cited

U.S. PATENT DOCUMENTS

2017/0324905 A1* 11/2017 Yu .................. H04N 23/6812
2023/0164409 A1*  5/2023 Kuo ................... H02K 41/035
                                                          348/374

FOREIGN PATENT DOCUMENTS

JP          2010-066561 A      3/2010
JP          2014-052438 A      3/2014

* cited by examiner

IMAGING APPARATUS

BACKGROUND OF THE INVENTION

Field of the Invention

The present disclosure relates to an imaging apparatus.

Description of the Related Art

For example, JP 2014-52438 A discloses an imaging apparatus that displaces an imaging element holding unit (imaging unit) to which an imaging element is fixed in a direction intersecting an optical axis to suppress an image of a subject from appearing in a blurred state in a captured image. A filter is provided in front of an imaging surface of the imaging element, and a seal member is disposed between the imaging surface of the imaging element and the filter. This seal member suppresses foreign matter such as dust from entering between the imaging surface of the imaging element and the filter.

SUMMARY OF THE INVENTION

Meanwhile, in the case of the imaging apparatus described in JP 2014-52438 A, there is a possibility that foreign matter such as dust flies in the air in the imaging apparatus due to displacement of the imaging element (imaging unit) performed by the tilt adjustment, and the foreign matter adheres to an optical component such as a filter. When foreign matter adheres to the optical component, the quality of the captured image is deteriorated.

Therefore, an object of the present disclosure is to suppress foreign matter such as dust flying in the air in an imaging apparatus from adhering to an optical component such as a filter due to displacement of an imaging element in the imaging apparatus in which the imaging element is displaced.

In order to solve the above problem, according to one aspect of the present disclosure, there is provided an imaging apparatus including: an imaging element including an imaging surface on which light from a subject is incident; an imaging unit that supports the imaging element in a state where the imaging surface faces forward; a casing including a through hole in a front surface and accommodating the imaging unit in a state where a front side portion of the imaging unit passes through the through hole so as to protrude from the front surface; and an actuator that is provided in the casing and displaces the imaging unit in a direction intersecting a normal direction of the imaging surface, in which the imaging unit includes a flange portion extending outward from the front side portion of the imaging unit and so as to cover at least part of a gap between the through hole of the casing and the imaging unit.

According to the present disclosure, in the imaging apparatus in which the imaging element is displaced, adhesion of foreign matter such as dust flying in the air in the imaging apparatus to an optical component such as a filter due to the displacement of the imaging element can be suppressed.

DESCRIPTION OF THE PREFERRED EMBODIMENT

Hereinafter, an embodiment will be described in detail with reference to the drawings as appropriate. However, unnecessarily detailed description may be omitted. For example, detailed description of already well-known matters and redundant description of substantially the same configuration may be omitted. This is to avoid the following description from becoming unnecessary redundant and to facilitate understanding by those skilled in the art.

In addition, the inventor(s) provides the accompanying drawings and the following description to enable those skilled in the art to sufficiently understand the present disclosure, which does not intend to limit the claimed subject matter.

Hereinafter, an imaging apparatus according to an embodiment of the present disclosure will be described with reference to the drawings.

First Embodiment

Figure 1:
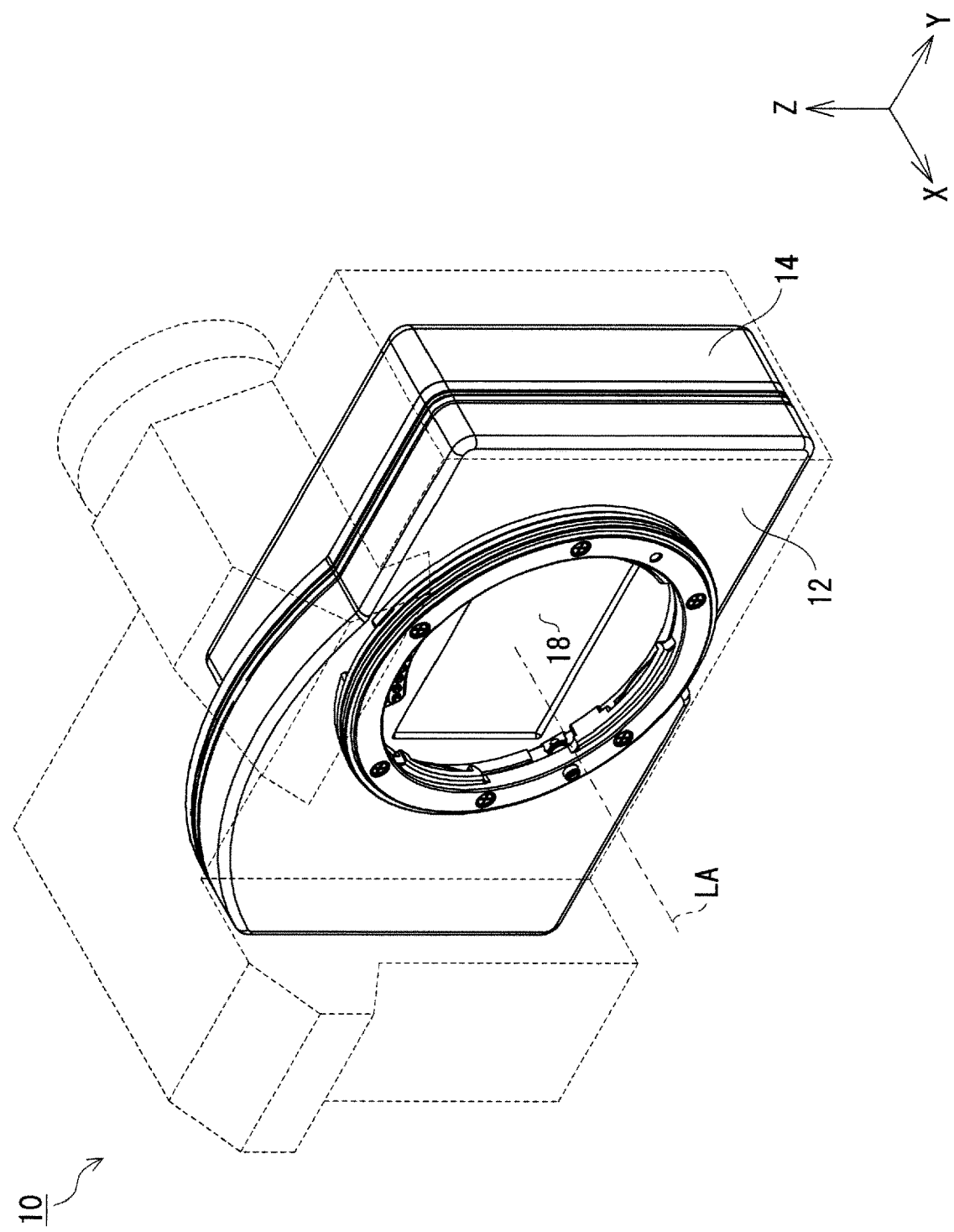
FIG. 1 is a schematic front perspective view of an imaging apparatus according to a first embodiment of the present disclosure.
Figure 2:
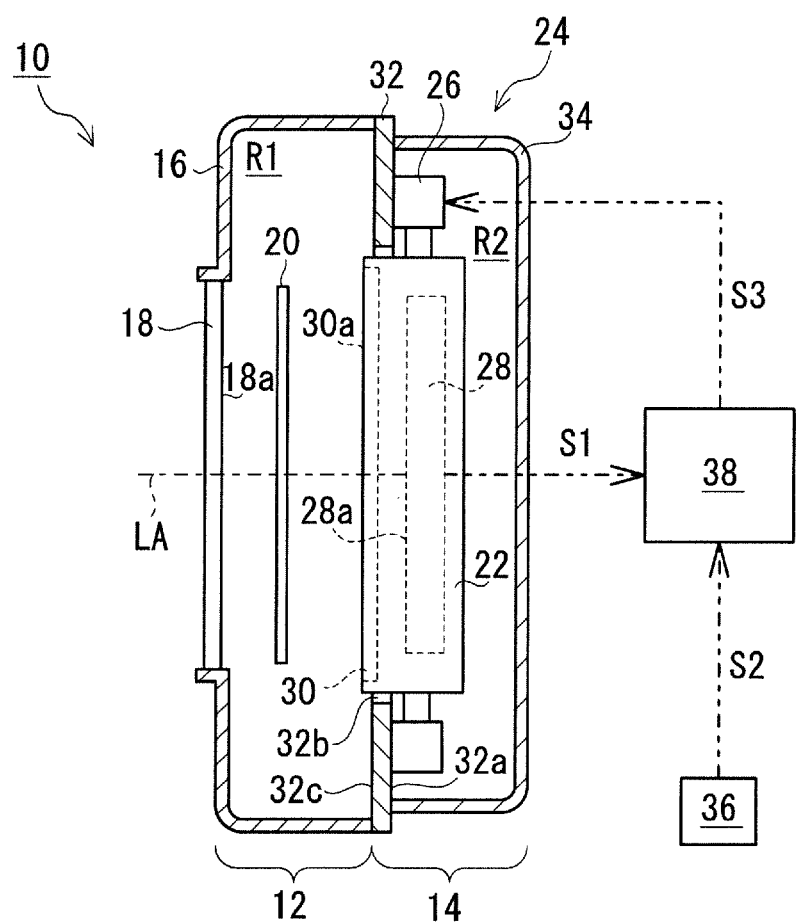
FIG. 2 is a schematic configuration view of the imaging apparatus.

FIG. 1 is a schematic front perspective view of an imaging apparatus according to a first embodiment of the present disclosure. Furthermore, FIG. 2 is a schematic configuration view of the imaging apparatus. Note that the X-Y-Z orthogonal coordinate system illustrated in the drawings is for facilitating understanding of the embodiment of the present disclosure, and does not limit the embodiment of the present disclosure. The X-axis direction is a front-rear direction of the imaging apparatus, the Y-axis direction is a left-right direction, and the Z-axis direction is a height direction. Note that a side where a subject is present at the time of capturing is defined as a front side of the imaging apparatus.

As illustrated in FIG. 1, an imaging apparatus 10 according to an embodiment of the present disclosure includes a filter module 12 and an imaging module 14.

As illustrated in FIGS. 1 and 2, in the case of the first embodiment, the filter module 12 and the imaging module 14 are connected to each other in the front-rear direction (X-axis direction) of the imaging apparatus 10. Specifically, they are connected such that the filter module 12 is located in front of the imaging module 14.

In addition, the filter module 12 includes a casing 16, a protective glass plate 18 provided in the casing 16 and through which light from a subject passes, and at least one optical filter 20 disposed in the casing 16. Note that the at least one optical filter 20 is, for example, an electronic ND filter, a non-electronic polarizing filter, an optical filter that transmits light of a specific wavelength, or the like.

In the first embodiment, the optical filter 20 is disposed in a substantially sealed storage space R1 defined by the casing 16 (and the protective glass plate 18) of the filter module 12 and the imaging module 14. As a result, the optical filter 20 is protected from foreign matter such as dust derived from the outside of the imaging apparatus 10.

The imaging module 14 includes an imaging unit 22, a casing 24 that houses the imaging unit 22, and an actuator 26 that is provided in the casing 24 and displaces the imaging unit 22 in the left-right direction (Y-axis direction) and the height direction of the imaging apparatus 10.

The imaging unit 22 includes an imaging element 28 including an imaging surface 28a on which light from a subject is incident. The imaging element 28 is a photoelectric conversion element such as a CCD or a CMOS, and outputs a signal S1 corresponding to light (image of the subject) from the subject incident on the imaging surface 28a via the protective glass plate 18 and the optical filter 20. The imaging element 28 is supported by the imaging unit 22 in a state where the imaging surface 28a faces the front of the imaging apparatus 10.

Note that the imaging unit 22 includes, for example, a substrate on which the imaging element 28 is mounted, a cover glass plate 30 covering the imaging surface 28a, and the like in addition to the imaging element 28. In the case of the first embodiment, a front surface 30a of the cover glass plate 30 is an incident portion of the imaging unit 22 on which light from the subject is incident. The light from the subject is incident on the front surface 30a of the cover glass plate 30, passes through the cover glass plate 30, and then is incident on the imaging surface 28a of the imaging element 28.

In the case of the first embodiment, the casing 24 includes a base plate 32 that supports the imaging unit 22 in a displaceable manner and constitutes a front side portion of the casing 24, and a cover member 34 that is attached to a rear surface 32a of the base plate 32 and constitutes a rear side portion of the casing 24.

The base plate 32 supports the imaging unit 22 so as to be displaceable in a direction intersecting the normal direction of the imaging surface 28a of the imaging element 28, that is, in the left-right direction (Y-axis direction) and the height direction (Z-axis direction) of the imaging apparatus 10 in the case of the first embodiment. Furthermore, the base plate 32 supports the imaging unit 22 such that the normal direction of the imaging surface 28a of the imaging element 28 coincides with an extending direction of an optical axis LA of the imaging apparatus 10, and the optical axis LA passes through the center of the imaging surface 28a. In the case of the first embodiment, the extending direction of the optical axis LA is parallel to the front-rear direction (X-axis direction) of the imaging apparatus 10.

The actuator 26 that displaces the imaging unit 22 in the left-right direction (Y-axis direction) and the height direction (Z-axis direction) of the imaging apparatus 10 is provided on the rear surface 32a of the base plate 32. Therefore, the imaging unit 22 is disposed on the rear surface 32a side of the base plate 32. A through hole 32b penetrating in the front-rear direction (X-axis direction) of the imaging apparatus 10 is formed in the base plate 32 such that light from a subject is incident on the imaging surface 28a of the imaging element 28 in the imaging unit 22. The front side portion of the imaging unit 22 passes through the through hole 32b toward the front side and protrudes from a front surface 32c of the base plate 32.

The cover member 34 defines a substantially sealed storage space R2 in cooperation with the rear surface 32a of the base plate 32. Most of the imaging unit 22 and the actuator 26 are stored in the storage space R2. As a result, the imaging unit 22 and the actuator 26 are protected from foreign matter such as dust derived from the outside of the imaging apparatus 10.

According to the structure of the filter module 12 and the imaging module 14, foreign matter such as dust cannot substantially enter the inside of these modules from the outside of the imaging apparatus 10. Therefore, foreign matter such as dust derived from the outside of the imaging apparatus 10 does not substantially adhere to the optical filter 20 or the cover glass plate 30 of the imaging unit 22. As a result, the optical filter 20 and the cover glass plate 30 are protected from foreign matter.

However, there is a possibility that foreign matter such as dust derived from the inside of the imaging apparatus 10 adheres to the optical filter 20 and the front surface 30a of the cover glass plate 30. Specifically, there is a possibility that foreign matter such as dust that has entered the storage space R2 of the imaging module 14 at the manufacturing stage flies into the air in the storage space R2 due to the displacement of the imaging unit 22, and the foreign matter flying in the air adheres to the optical filter 20 and the cover glass plate 30.

With respect to the displacement of the imaging unit 22, the imaging apparatus 10 according to the first embodiment is configured to control the actuator 26 on the basis of vibration applied to the imaging apparatus 10, for example, vibration transmitted from the hand of the user, and displace the imaging unit 22 in the left-right direction (Y-axis direction) and the height direction (Z-axis direction) of the imaging apparatus 10.

Specifically, the imaging apparatus 10 includes a vibration detection sensor 36 that detects vibration applied to the imaging apparatus 10, and a controller 38 that controls the actuator 26 on the basis of a detection signal S2 from the vibration detection sensor 36.

The vibration detection sensor 36 is, for example, an angular velocity sensor that detects an angular velocity of the imaging apparatus 10. The controller 38 is a processor such as a CPU or an MPU, and outputs a control signal S3 to the actuator 26 based on a program stored in a storage device (not illustrated) such as a memory and the detection signal S2 from the vibration detection sensor 36. For example, the controller 38 outputs, to the actuator 26, the control signal S3 for displacing the imaging unit 22 in the direction opposite to the direction in which the imaging apparatus 10 is displaced. By such control, the imaging surface 28a of the imaging element 28 of the imaging unit 22 is maintained at a constant position with respect to the subject, and an image of the subject is formed at a constant position on the imaging surface 28a. As a result, the image of the subject is suppressed from being blurred in the captured image.

For such control of the actuator 26, the imaging unit 22 and the actuator 26 are displaced (moved) in the storage space R2. Due to the displacement, air flows in the storage space R2, and foreign matter such as dust having adhered to the imaging unit 22, the actuator 26, and the inner surface of the casing 24 (that is, the rear surface 32a of the base plate 32 and the inner surface of the cover member 34) at the manufacturing stage may fly in the air in the storage space R2. In addition, there is a possibility that the foreign matter floating in the storage space R2 moves to the storage space R1 through the through hole 32b of the base plate 32. When the foreign matter moves to the storage space R1, there is a possibility that the foreign matter adheres to a rear surface 18a of the protective glass plate 18, the optical filter 20, and the front surface 30a of the cover glass plate 30 existing in the storage space R1. When such adhesion occurs, the quality of the captured image is deteriorated.

Therefore, the imaging apparatus 10 according to the first embodiment is configured to suppress movement of foreign matter such as dust that has entered the storage space R2 to the storage space R1 at the manufacturing stage.

Figure 3:
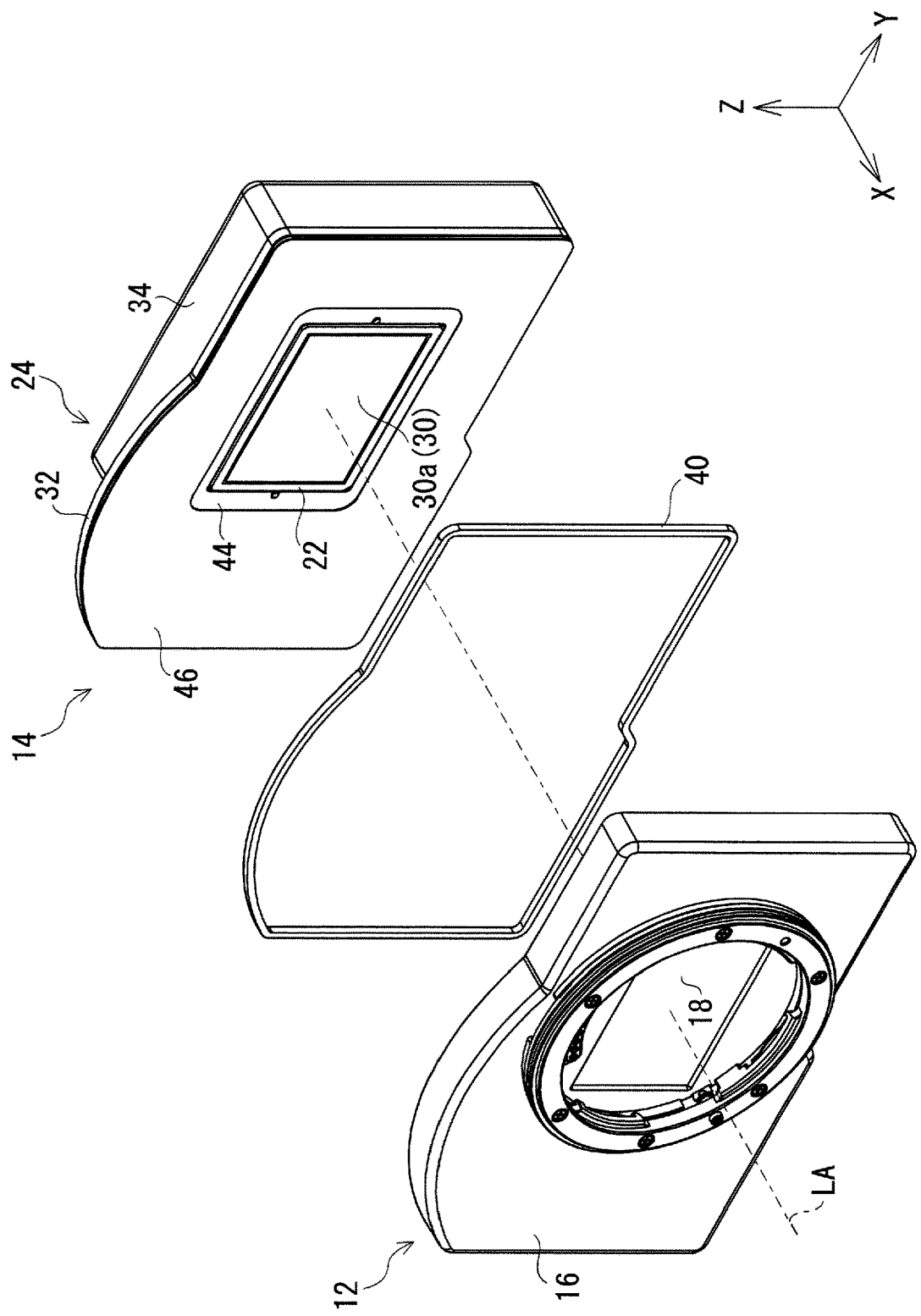
FIG. 3 is a front perspective view of a filter module and an imaging module separated from each other.
Figure 4:
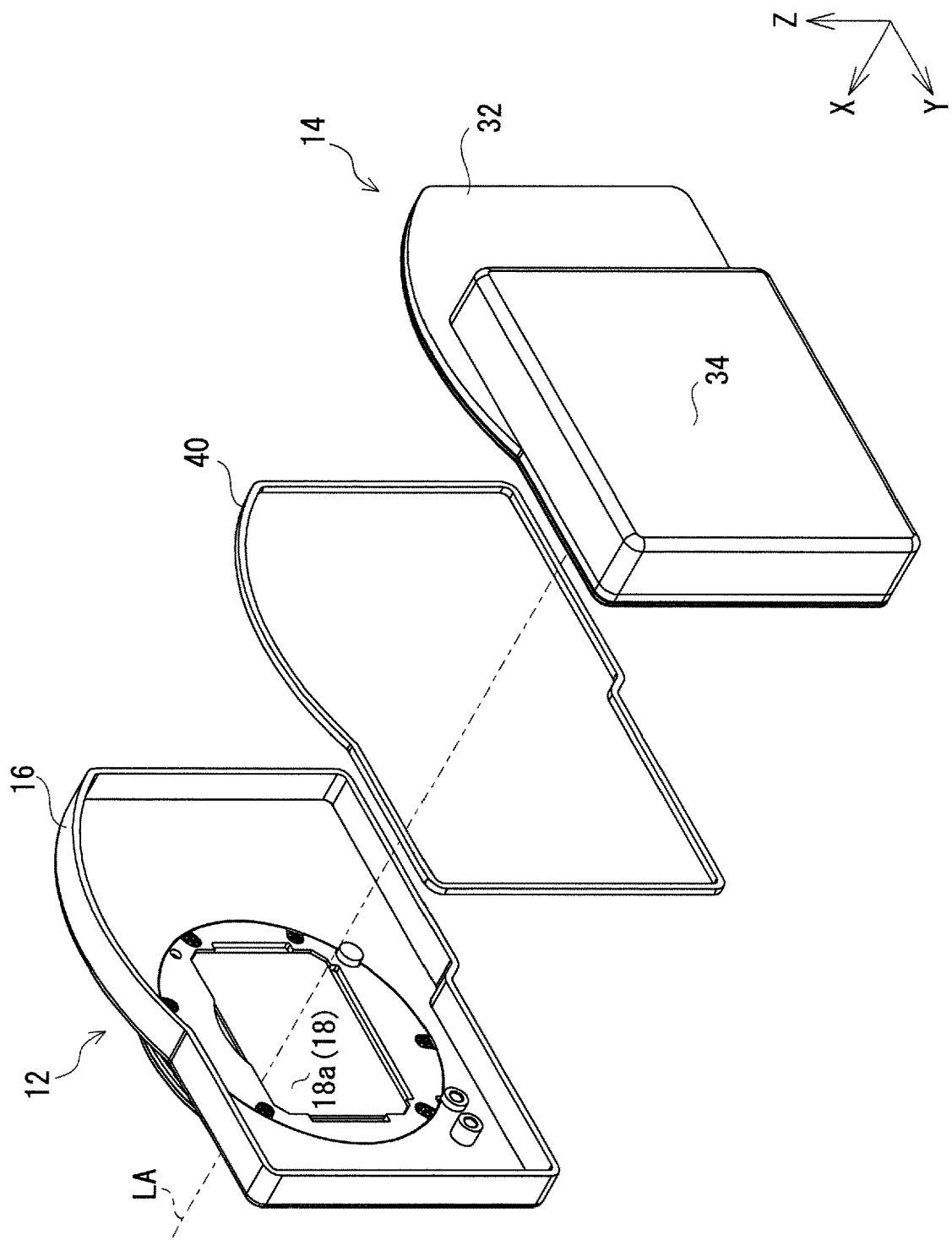
FIG. 4 is a rear perspective view of the filter module and the imaging module separated from each other.
Figure 5:
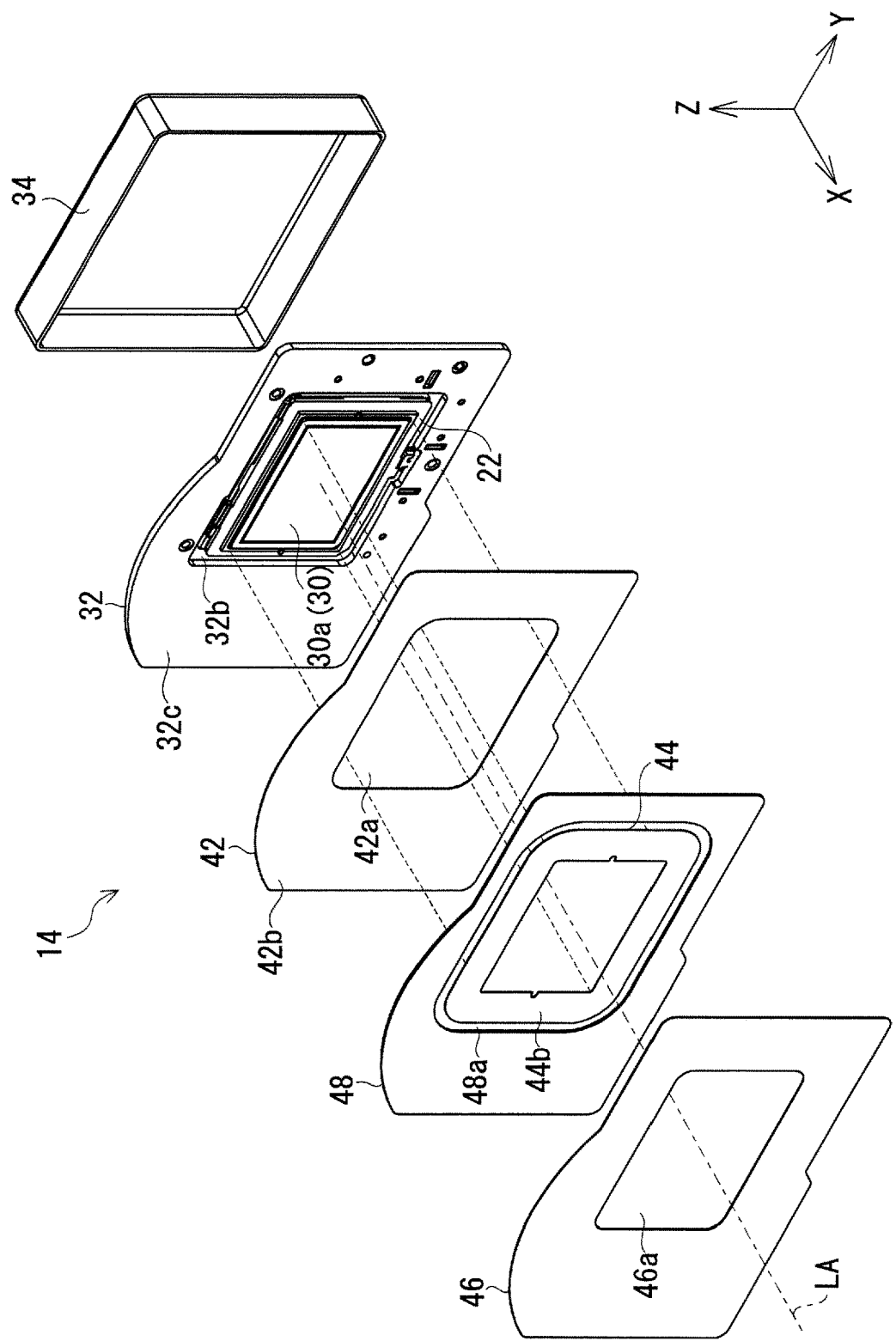
FIG. 5 is an exploded perspective view of the imaging module.
Figure 6:
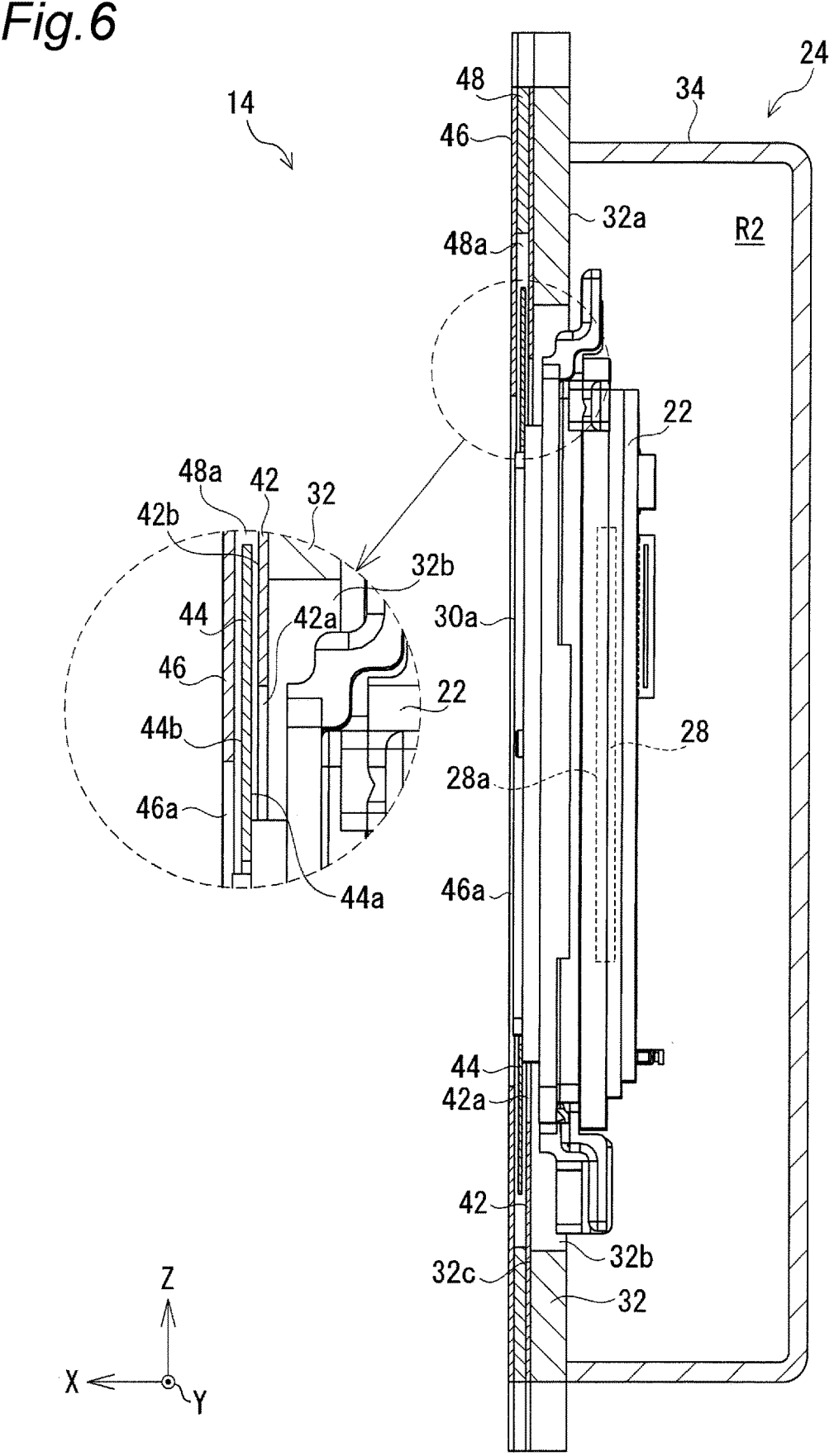
FIG. 6 is a cross-sectional view of the imaging module.

FIG. 3 is a front perspective view of the filter module and the imaging module separated from each other. FIG. 4 is a rear perspective view of the filter module and the imaging module separated from each other. FIG. 5 is an exploded perspective view of the imaging module. FIG. 6 is a cross-sectional view of the imaging module. In FIG. 6, components such as the actuator 26 other than the imaging unit 22 present in the storage space R2 are not illustrated.

As illustrated in FIGS. 3 and 4, the filter module 12 and the imaging module 14 are connected via an annular seal member 40. As a result, the storage space R1 is substantially sealed.

As illustrated in FIGS. 5 and 6, the imaging module 14 includes a first fixed seal sheet 42 fixed to the front surface 32c of the base plate 32, and a movable seal sheet 44 attached to a front side portion of the imaging unit 22.

The first fixed seal sheet 42 is made of, for example, a resin material, and is attached to the base plate 32 via, for example, a double-sided tape. In addition, the first fixed seal sheet 42 includes a through hole 42a passing through the front side portion of the imaging unit 22.

The movable seal sheet 44 is, for example, an annular sheet made of a resin material and extending outward from a front side portion of the imaging unit 22 that has passed through the through hole 32b of the base plate 32 and the through hole 42a of the first fixed seal sheet 42. The movable seal sheet 44 extends outward to cover a gap between the inner peripheral surface of the through hole 32b of the base plate 32 and the imaging unit 22 (further, a gap between the inner peripheral surface of the through hole 42a of the first fixed seal sheet 42 and the imaging unit 22) as viewed in the front-rear direction (as viewed in the X-axis direction) of the imaging apparatus 10.

The movable seal sheet 44 extends along the front surface 32c of the base plate 32 (along a front surface 42b of the first fixed seal sheet 42 in the case of the first embodiment). A rear surface 44a of the movable seal sheet 44 faces the front surface 32c of the base plate 32 (the front surface 42b of the first fixed seal sheet 42 in the case of the first embodiment) at an interval in the front-rear direction (X-axis direction) of the imaging apparatus 10.

In the case of the first embodiment, the imaging module 14 also includes a second fixed seal sheet 46 and a spacer member 48 that supports the second fixed seal sheet 46.

The second fixed seal sheet 46 is made of, for example, a resin material, and is disposed in front of the movable seal sheet 44. In addition, the second fixed seal sheet 46 includes a through hole 46a that exposes the incident surface of the imaging unit 22, that is, the front surface 30a of the cover glass plate 30. The opening of the through hole 46a is included in the outer contour of the movable seal sheet 44 as viewed in the normal direction of the imaging surface 28a of the imaging element 28 (the front-rear direction (X-axis direction) of the imaging apparatus 10 in the case of the present embodiment). In addition, the second fixed seal sheet 46 faces a front surface 44b of the movable seal sheet 44 at an interval in the front-rear direction (X-axis direction) of the imaging apparatus 10.

The spacer member 48 is provided on the first fixed seal sheet 42 and supports the second fixed seal sheet 46. The spacer member 48 forms an arrangement space for the movable seal sheet 44 between the first fixed seal sheet 42 and the second fixed seal sheet 46.

In the case of the first embodiment, the spacer member 48 includes a through hole 48a. The movable seal sheet 44 is disposed in the through hole 48a.

The gap between the inner peripheral surface of the through hole 32b of the base plate 32 and the imaging unit 22 is substantially sealed by the first fixed seal sheet 42, the movable seal sheet 44, the second fixed seal sheet 46, and the spacer member 48. That is, a so-called labyrinth seal structure that closes the gap is provided in the imaging module 14.

The gap between the through hole 32b of the base plate 32 and the imaging unit 22 is not completely closed. Specifically, the gap is completely closed as viewed in the penetrating direction of the through hole 32b (that is, the front-rear direction (X-axis direction) of the imaging apparatus 10). On the other hand, the gap communicates with the storage space R1 through a space between the first fixed seal sheet 42 and the movable seal sheet 44 and a space between the movable seal sheet 44 and the second fixed seal sheet 46. However, an interval between these seal sheets is small enough to suppress intrusion of foreign matter such as dust. In addition, since the space between these seal sheets is a space that thinly expands outward from the through hole 32b, the space distance from the gap to the storage space R1 is long. As a result, foreign matter such as dust cannot substantially move from the gap to the storage space R1. Therefore, the gap between the through hole 32b of the base plate 32 and the imaging unit 22 is substantially sealed.

According to such a labyrinth seal structure, when the imaging unit 22 is displaced by the actuator 26, the movable seal sheet 44 attached to the imaging unit 22 is also displaced. Specifically, the movable seal sheet 44 is displaced between the first fixed seal sheet 42 and the second fixed seal sheet 46 without being in contact with the inner peripheral surface of the through hole 32b of the base plate 32 and the imaging unit 22 while maintaining a state of covering the gap between the inner peripheral surface of the through hole 32b and the imaging unit 22. In the case of the first embodiment, the movable seal sheet 44 is displaced in the through hole 48a of the spacer member 48.

Note that the outer contour of the movable seal sheet 44 is preferably a contour that is maintained in a state where the opening of the through hole 46a of the second fixed seal sheet 46 is included as viewed in the normal direction of the imaging surface 28a of the imaging element 28 (the front-rear direction (X-axis direction) of the imaging apparatus 10 in the case of the present embodiment) even if the movable seal sheet 44, that is, the imaging unit 22 is displaced by the maximum displacement amount. As a result, the space distance from the gap between the through hole 32b of the base plate 32 and the imaging unit 22 to the through hole 46a of the second fixed seal sheet 46 is suppressed from becoming extremely short. For example, it is possible to suppress communication between the gap and a part of the through hole 46a at the shortest distance in the front-rear direction of the imaging apparatus 10 due to the movable seal sheet 44 does not exist between the gap and the part of the through hole 46a.

With such a labyrinth seal structure, the gap between the inner peripheral surface of the through hole 32b of the base plate 32 and the imaging unit 22 is substantially sealed without affecting the displacement of the imaging unit 22. When the imaging unit 22 is displaced, movement of foreign matter such as dust from the storage space R2 to the storage space R1 through the gap between the inner peripheral surface of the through hole 32b of the base plate 32 and the imaging unit 22 is suppressed.

According to the first embodiment as described above, in the imaging apparatus 10 in which the imaging element 28 is displaced, it is possible to suppress foreign matter such as dust flying in the air in the imaging apparatus (particularly in the imaging module 14 in the case of the present embodiment) from adhering to an optical component such as a filter due to the displacement of the imaging element 28.

Second Embodiment

A second embodiment is a simplified form of the above-described first embodiment. Therefore, components of the second embodiment substantially the same as the components of the above-described first embodiment are denoted by the same reference numerals.

Figure 7:
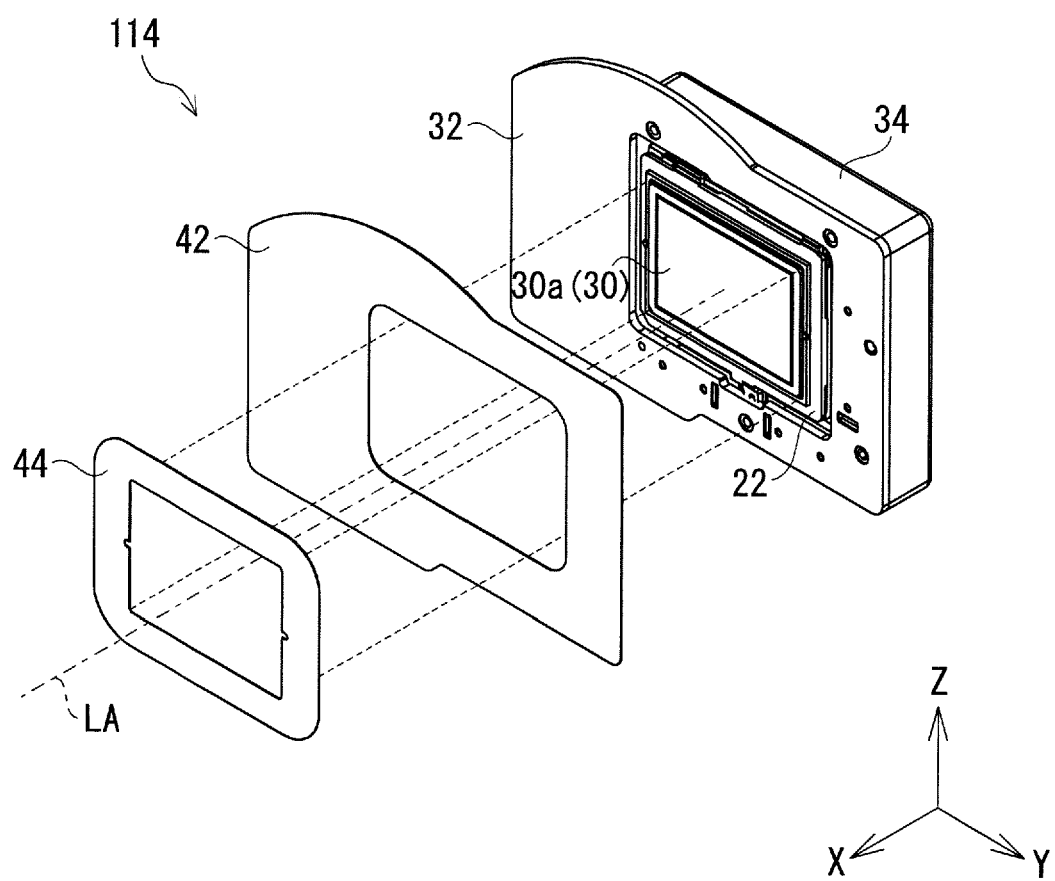
FIG. 7 is an exploded perspective view of an imaging module in an imaging apparatus according to a second embodiment.

FIG. 7 is an exploded perspective view of an imaging module in the imaging apparatus according to the second embodiment.

As illustrated in FIG. 7, an imaging module 114 in the imaging apparatus according to the second embodiment corresponds to the imaging module 14 of the above-described first embodiment from which the second fixed seal sheet 46 and the spacer member 48 are removed.

Also in the second embodiment, similarly to the above-described first embodiment, in the imaging apparatus 10 in which the imaging element 28 is displaced, it is possible to suppress foreign matter such as dust from flying in the air in the imaging apparatus (particularly in the imaging module 14 in the case of the present embodiment) due to the displacement of the imaging element 28, and the foreign matter from adhering to an optical component such as a filter.

Although the embodiment of the present disclosure has been described above with reference to the above-described embodiment, the embodiment of the present disclosure is not limited to the above-described embodiment.

For example, in the case of the above-described first embodiment, as illustrated in FIG. 6, the movable seal sheet 44 faces the first fixed seal sheet 42 fixed to the front surface 32c of the base plate 32 of the casing 24 at an interval. However, the embodiment of the present disclosure is not limited thereto. The movable seal sheet 44 may be in contact with the first fixed seal sheet 42 without an interval therebetween. However, in that case, the frictional force between the first fixed seal sheet 42 and the movable seal sheet 44 needs to be small to such an extent that the frictional force does not become a resistance when the actuator 26 displaces the imaging unit 22. Further, it is premised that, when the movable seal sheet 44 slides on the front surface 42b of the first fixed seal sheet 42, wear debris of at least one of these is not generated.

In the case of the above-described first embodiment, as illustrated in FIGS. 5 and 6, the first fixed seal sheet 42 is fixed to the front surface 32c of the base plate 32 of the casing 24. However, the embodiment of the present disclosure is not limited thereto. When the base plate 32 has no through hole other than the through hole 32b, the first fixed seal sheet 42 can be omitted. In this case, the movable seal sheet 44 extends along the front surface 32c of the base plate 32.

Furthermore, in the case of the above-described first embodiment, as illustrated in FIG. 6, movable seal sheet 44 extends beyond the gap between the through hole 32b and the imaging unit 22 and thus along the first fixed seal sheet 42, so as to cover the entire gap. However, the embodiment of the present disclosure is not limited thereto. The movable seal sheet may cover a part of the gap.

Furthermore, in the case of the above-described first embodiment, as illustrated in FIG. 6, the movable seal sheet 44 is attached to the front side portion of the imaging unit 22 that has passed through the through hole 32b of the base plate 32, and extends outward so as to cover the gap between the through hole 32b and the imaging unit 22. That is, the movable seal sheet 44 has a so-called flange shape. However, the embodiment of the present disclosure is not limited thereto. Instead of the movable seal sheet 44, a flange portion extending outward may be integrally formed on a front side portion of the imaging unit 22.

That is, in a broad sense, an imaging apparatus according to an embodiment of the present disclosure includes: an imaging element including an imaging surface on which light from a subject is incident; an imaging unit that supports the imaging element in a state where the imaging surface faces forward; a casing including a through hole in a front surface and accommodating the imaging unit in a state where a front side portion of the imaging unit passes through the through hole so as to protrude from the front surface; and an actuator that is provided in the casing and displaces the imaging unit in a direction intersecting a normal direction of the imaging surface, in which the imaging unit includes a flange portion extending outward from the front side portion of the imaging unit so as to cover at least part of a gap between the through hole of the casing and the imaging unit.

As described above, the above-described embodiment has been described as an example of the technique in the present disclosure. To that end, the drawings and the detailed description are provided. Therefore, the components described in the drawings and the detailed description may include not only components essential for solving the problem but also components that are not essential for solving the problem in order to describe the above-described technology. Therefore, it should not be immediately recognized that these non-essential components are essential based on the fact that these non-essential components are described in the drawings and the detailed description.

Further, the above-described embodiment is provided to describe the technique in the present disclosure, and hence it is possible to make various changes, replacements, additions, omissions, and the like within the scope of claims or the equivalent thereof.

The present disclosure is applicable to an imaging apparatus including a plurality of ND filters having different light transmittances.

What is claimed is:

1. An imaging apparatus comprising:
    an imaging element including an imaging surface on which light from a subject is incident;
    an imaging unit that supports the imaging element in a state where the imaging surface faces forward;
    a casing including a through hole in a front surface and accommodating the imaging unit in a state where a front side portion of the imaging unit passes through the through hole so as to protrude from the front surface; and
    an actuator that is provided in the casing,
    wherein the imaging unit includes a flange portion extending outward from the front side portion of the imaging unit so as to cover at least part of a gap between the through hole of the casing and the imaging unit, and
    the actuator displaces the imaging unit, including the flange portion, in a direction intersecting a normal direction of the imaging surface.

2. The imaging apparatus according to claim 1, wherein the flange portion extends beyond the gap and along a front surface of the casing.

3. The imaging apparatus according to claim 2, wherein the flange portion faces the front surface of the casing at an interval therebetween.

4. The imaging apparatus according to claim 1, wherein the flange portion is an annular movable seal sheet attached to the front side portion of the imaging unit.

5. The imaging apparatus according to claim 4, further comprising a first fixed seal sheet that includes a through hole through which the front side portion of the imaging unit passes, is fixed to the front surface of the casing, and faces a rear surface of the movable seal sheet at an interval therebetween.

6. The imaging apparatus according to claim 5, further comprising:
- a second fixed seal sheet that includes a through hole that exposes an incident portion of the imaging unit and has an opening included in an outer contour of the movable seal sheet as viewed in the normal direction, and faces a front surface of the movable seal sheet at an interval; and
- a spacer member that is provided on the first fixed seal sheet, supports the second fixed seal sheet, and forms an arrangement space for the movable seal sheet between the first fixed seal sheet and the second fixed seal sheet.

7. The imaging apparatus according to claim 6, wherein the outer contour of the movable seal sheet is a contour maintained in a state where the opening of the through hole of the second fixed seal sheet is included as viewed in the normal direction even if the movable seal sheet is displaced by a maximum displacement amount.

8. The imaging apparatus according to claim 1, further comprising an optical filter in front of the front surface of the casing.

9. The imaging apparatus according to claim 1, wherein the imaging unit includes a cover glass plate covering the imaging surface of the imaging element.

* * * * *